(12) United States Patent
Hsu

(10) Patent No.: US 7,502,029 B2
(45) Date of Patent: Mar. 10, 2009

(54) INSTRUCTION FOLDING MECHANISM, METHOD FOR PERFORMING THE SAME AND PIXEL PROCESSING SYSTEM EMPLOYING THE SAME

(75) Inventor: R-ming Hsu, Jhudong Township (TW)

(73) Assignee: Silicon Integrated Systems Corp., Hsinchu (TW)

( * ) Notice: Subject to any disclaimer, the term of this patent is extended or adjusted under 35 U.S.C. 154(b) by 422 days.

(21) Appl. No.: 11/333,479

(22) Filed: Jan. 17, 2006

(65) Prior Publication Data

US 2007/0165028 A1    Jul. 19, 2007

(51) Int. Cl.
*G06T 1/00* (2006.01)
*G06T 15/00* (2006.01)
*G06F 15/00* (2006.01)
*G06F 9/00* (2006.01)

(52) U.S. Cl. .................. 345/522; 712/221; 712/241

(58) Field of Classification Search ............... 712/241, 712/221; 345/522
See application file for complete search history.

(56) References Cited

U.S. PATENT DOCUMENTS

| | | | | |
|---|---|---|---|---|
| 5,163,139 A | * | 11/1992 | Haigh et al. | 712/206 |
| 5,522,078 A | * | 5/1996 | Matsuzuki | 717/107 |
| 6,349,383 B1 | * | 2/2002 | Col et al. | 712/226 |
| 6,825,843 B2 | * | 11/2004 | Allen et al. | 345/522 |
| 6,980,209 B1 | * | 12/2005 | Donham et al. | 345/426 |
| 2002/0057446 A1 | * | 5/2002 | Long et al. | 358/1.13 |
| 2008/0098206 A1 | * | 4/2008 | Naoi | 712/221 |

* cited by examiner

*Primary Examiner*—M Good Johnson

(57) ABSTRACT

An instruction folding mechanism, a method for performing the instruction folding mechanism and a pixel processing system employing the instruction folding mechanism are described. The pixel processing system comprises an instruction folding mechanism and a pixel shader. The instruction folding mechanism folds a plurality of first instructions in a first program to generate a second program having at least one second instruction which is a combination of the first instructions. The pixel shader connected to the instruction folding mechanism fetches the second program to decode at least the second instruction having the combination of the first instructions to execute the second program. The instruction folding mechanism comprises an instruction scheduler, a folding rule checker, and an instruction combiner. The instruction scheduler connected to the folding rule checker is used to scan the first instructions according to static positions in order to schedule the first instructions in the first program. The folding rule checker checks the first instructions according to a folding rule whether the first instructions has data independency. The instruction combiner connected to the folding rule checker can combine the first instructions having the data independency to generate at least the second instruction.

21 Claims, 9 Drawing Sheets

3:1
2:2

INSTRUCTION FOLDING MECHANISM, METHOD FOR PERFORMING THE SAME AND PIXEL PROCESSING SYSTEM EMPLOYING THE SAME

FIELD OF THE INVENTION

The present invention relates to a folding mechanism, a method for performing the folding mechanism and a pixel processing system employing the same, and more particularly to an instruction folding mechanism, a method for performing the instruction folding mechanism and a pixel processing system employing the instruction folding mechanism applied to a graphic processor unit (GPU).

BACKGROUND OF THE INVENTION

FIG. 1 is a block diagram of a pipeline configuration of a conventional graphic processor unit. The conventional graphic processor unit 100 mainly includes a triangle setup unit 102, a pixel processing unit 104 and a depth processing unit 106. The pixel processing unit 104 has a pixel shader 108, a texture unit 110 and a color interpolator 112 both connected to the pixel shader 108.

A surface of three-dimensional (3D) object is divided into a plurality of triangles two-dimensionally arranged in terms of their neighboring relationship and having an arbitrary size. Each of the triangles has three vertices which are forwarded to the triangle setup unit 102. The triangle setup unit 102 outputs the parameters of the pixels, such as the positions of the pixels in triangles and texture coordinates of the vertices of the corresponding triangles, to the pixel processing unit 104. In the pixel processing unit 104, based on the positions of the pixels and texture coordinates of the vertices, the texture unit 110 interpolates the texture coordinates for all the pixels. The interpolated texture coordinates of the pixels are inputted and then processed in the pixel shader 108 (with DirectX terms, or Fragment Processor in OpenGL terms). Next, the pixel shader 108 executes a texture load instruction to return the processed texture coordinates to the texture unit 110. Based on the unprocessed texture coordinates and the processed texture coordinates, the texture unit 110 samples the texture colors of the pixels in a texture map and outputs the texture colors to the pixel shader 108. Meanwhile, based on the positions of the pixels and texture coordinates of the vertices, the color interpolator 112 interpolates the vertex colors for all the pixels and outputs the vertex colors of the pixels to the pixel shader 108. The pixel shader 108 then processes the texture colors and the vertex colors of the pixels and outputs color values and depth values of the pixels to the depth processing unit 106, the final pixel colors are obtained. The final pixel colors are then becoming available for drawing the whole frame.

FIG. 2 is a block diagram of an example program in a pixel shader of the conventional graphic processor. The pixel shader 108 usually includes five kinds of registers: temporary registers $r_n$ for storing temporary data, texture coordinate registers $t_n$, texture numbering registers $s_n$, vertex color registers $v_n$, and outputting registers $_oc_n$ for transforming the final pixel colors to the depth processing unit 106.

The process of the pixel shader 108 normally has four stages: a coordinate calculation stage, a texture processing stage, a color blending stage and an issue out stage. The interpolated texture coordinates of the pixels from the texture unit 110 are stored in the texture coordinates registers $t_n$. In the coordinate calculation stage, the arithmetic, for the interpolated texture coordinates of the pixels from the texture unit 110, is conducted in the texture coordinates registers $t_n$ and the temporary registers $r_n$; the arithmetic results, i.e. the processed texture coordinates, are stored in the temporary registers $r_n$. In the texture processing stage, based on the texture coordinates in the registers $t_n$ and $r_n$, the pixel shader 108 executes texture load instructions to postulate the texture unit 110 to sample texture colors of the pixels in a texture map. The texture map is appointed by the texture numbering registers $s_n$. The sampled texture colors are transformed to the temporary registers $r_n$. In the color blending stage, the pixel shader 108 blends the texture colors stored in the temporary registers $r_n$ with the vertex colors from the color interpolator 112 and the blending result is stored in the vertex color registers $v_n$. In the issued stage, the pixel shader 108 outputs color and depth values of the pixels to the depth processing unit 106. It should be noted that the coordinate calculation stage, the texture processing stage and the color blending stage may be repetitiously processed or be omitted, respectively.

Each of the registers is composed of four components, e.g. (x, y, z, w) or (r, g, b, a) which are so-called four-wide vectors and data format of floating point. In the coordinate calculation and texture processing stages, the four components (x, y, z, w) represent coordinates in a three-dimensional (3D) space or of different texture formats. In the color blending and issued stage, the four components (r, g, b, a) represent three primary colors of red, green and blue, and transparency. The components of source and target registers are assigned to instructions to read out or write the components. For example, r0.w represents the instructions that can read out or write component "w" of register "r0".

Since processing steps of color components "r", "g", and "b" are considerably different from the transparency component "a", there is a need of two independent pipelines to process these different kinds of components. When representing coordinates, "x", "y" and "z" are also considerably different from the perspective component "w". In DirectX standard, two independent pipelines are serially merged and concurrently issued out by a plus sign "+" preceding the second instruction of the pair, which is defined as instruction pairing or co-issue and has a component ratio of 3 to 1, as shown in FIG. 3A. However, the number of operator decoders, pipelines, register write ports and register read ports for the instructions is increased at least double the amount. Moreover, it is necessary to provide additional complicated functions, such as component selection, format transformation, source modification, and instruction modification in the pixel shader so that instructions can process operands located in the source and target registers. As a result, hardware cost of performing the functions is increased extremely.

Referring to FIG. 3B, a ratio diagram of two color components to two transparency components for the instructions in a conventional pixel shader program is illustrated here. In these two independent instructions, one is used to write color components "r" and "g", and the other is used to write color components "b" and transparency "a". Although the probability of instruction pairing or co-issue is increased, however, it has a more complicated architecture and a higher cost in the hardware of pixel shader. The nVidia Corporation began to implement such complicated co-issue in their GeForce6 Series GPU.

Referring to FIG. 4, a conventional pixel shader with a co-issue mechanism is shown here. The fetcher 400 reads out two instructions from the instruction queue 402 according to the program counter (PC). A pair of decoders (404a, 404b) decodes control signals from the fetched instructions, respectively, to control the pipeline operation of the arithmetic logic units (ALUs) (406a, 406b). The pair of ALU (406a, 406b)

implements four vector components in parallel and consumes a pair of register ports (408a, 408b). Each of register ports (408a, 408b) includes three register read ports and a write port. Furthermore, it is necessary to use a source and an instruction modifier for each register port to process component selections and format transformation of source and target operands in the instruction.

Therefore, the co-issue mechanism requires an additional check mechanism to determine the timing of co-issue rule. Furthermore, since source and target registers of the two instructions are different in the timing of co-issue rule, the consumption of register read ports and register write ports are at least doubled the amount. The number of the source modifier and instruction modifier are also at least doubled the amount.

Consequently, there is a need to develop a pixel processing system having an instruction folding mechanism for reducing the hardware cost and increasing performance of graphic processor unit.

SUMMARY OF THE INVENTION

The first objective of the present invention is to provide a folding mechanism applied to a pixel processing system to fold instructions with data independency into reduced instructions for generating a new program.

The second objective of the present invention is to provide a folding mechanism applied to a pixel processing system to fold instructions having an identical target register and output data to different components of the target register to save the hardware cost of pixel processing system.

The third objective of the present invention is to provide a folding mechanism applied to a pixel processing system to improve the performance of the pixel processing system.

According to the above objectives, the present invention sets forth an instruction folding mechanism, a method for performing the folding mechanism and a pixel processing system employing the same. The pixel processing system comprises an instruction folding mechanism and a pixel shader. The instruction folding mechanism folds a plurality of first instructions in a first program to generate a second program having at least one second instruction which is a combination of the first instructions. The pixel shader connected to the instruction folding mechanism fetches the second program to decode at least the second instruction having the combination of the first instructions to execute the second program.

The instruction folding mechanism comprises an instruction scheduler, a folding rule checker, and an instruction combiner. The instruction scheduler connected to the folding rule checker is used to scan the first instructions according to static positions to schedule the first instructions in the first program. Preferably, the instruction scheduler successively scans the first instructions. The folding rule checker checks the first instructions according to a folding rule whether the first instructions has data independency. The instruction combiner connected to the folding rule checker can combine the first instructions having the data independency to generate at least the second instruction.

In the relationship of data independency between two adjacent first instructions, the source register of the later first instruction is different from a target register of the former first instruction. In other words, both the source register of the later first instruction and the target register of the former first instruction have a null set. In addition, the data of the two adjacent first instructions is outputted into different components in the target register. In one embodiment, the total number of the source operands of the first and second instructions is within a predetermined threshold value, e.g. 3, 4, or more, so that the decoder can decode the combination of the first instructions.

In operation, a plurality of first instruction in a first program is folded by an instruction folding mechanism to generate a second program having at least one second instruction which is a combination of the first instruction. Afterwards, the second instruction can be fetched according to a program counter. Control signals are decoded from the second instruction having the combination with the first instruction. Then, an operation of a plurality of register components of the second instruction is performed according to the control signal by an ALU. Finally, the register components are selected to transform operand formats of the second instruction by a register port.

The present invention folds instructions with data independency into reduced instructions for generating a new program. The folding instructions have an identical target register and output data to different components of the target register to save the hardware cost of pixel processing system. Because these rules are the most frequently case that the fourth component is separately used, the performance of the expensive co-issue hardware mechanism can be achieve by a much chipper extended decoder.

DETAILED DESCRIPTION OF THE PREFERRED EMBODIMENTS

The present invention is directed to an instruction folding mechanism, a method for performing the instruction folding mechanism and a pixel processing system employing the instruction folding mechanism to fold instructions with data independency into reduced instructions for generating a new program. Furthermore, the instruction folding mechanism is used to fold instructions having an identical target register and outputs data to different components of the target register to save the hardware cost of pixel processing system. It should be noted that the instruction folding mechanism is also suitable for vertex shader, geometric shader or a combination of the two.

Figure 1:
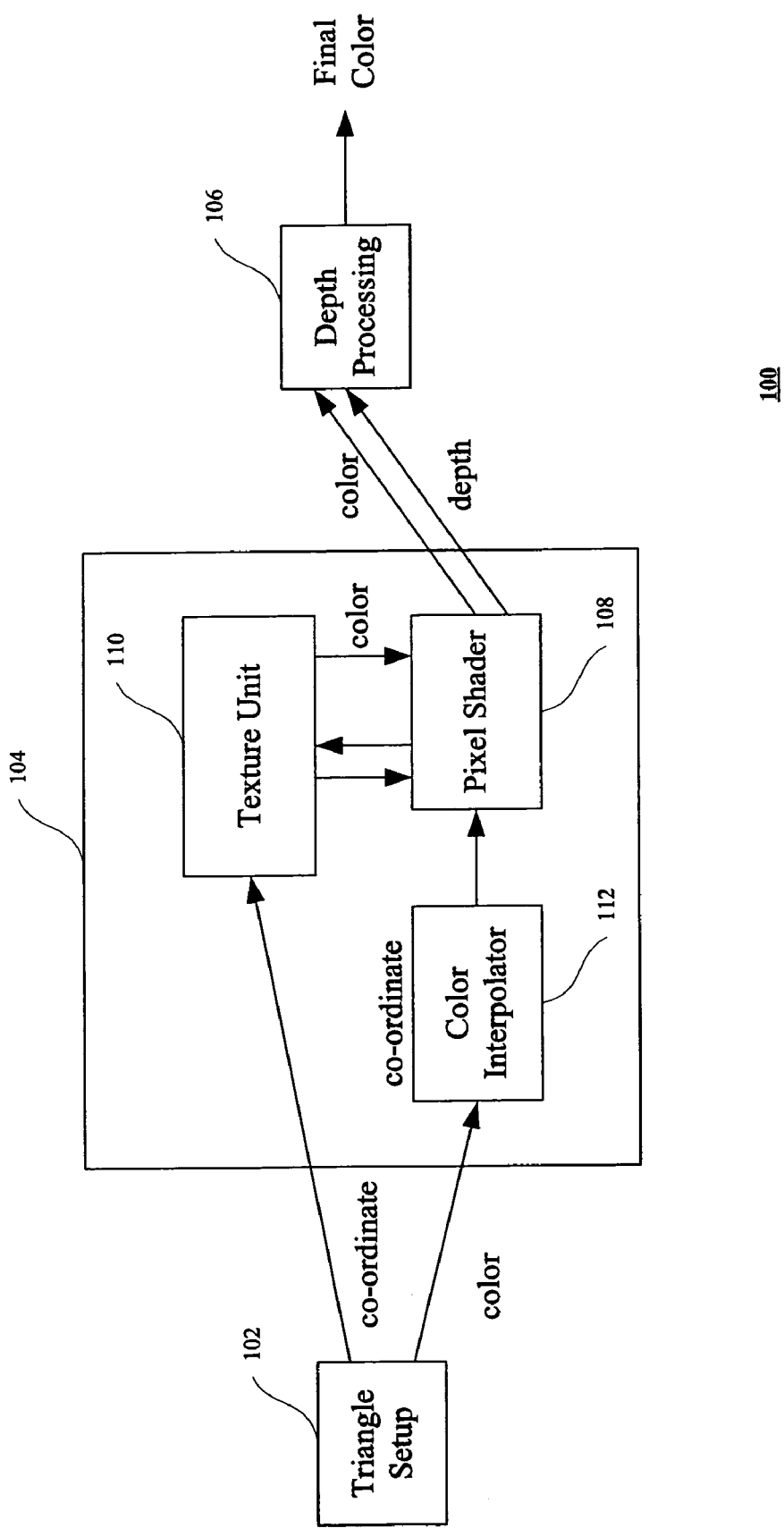
FIG. 1 is a block diagram of a pipeline configuration of a conventional graphic processor unit.
Figure 2:
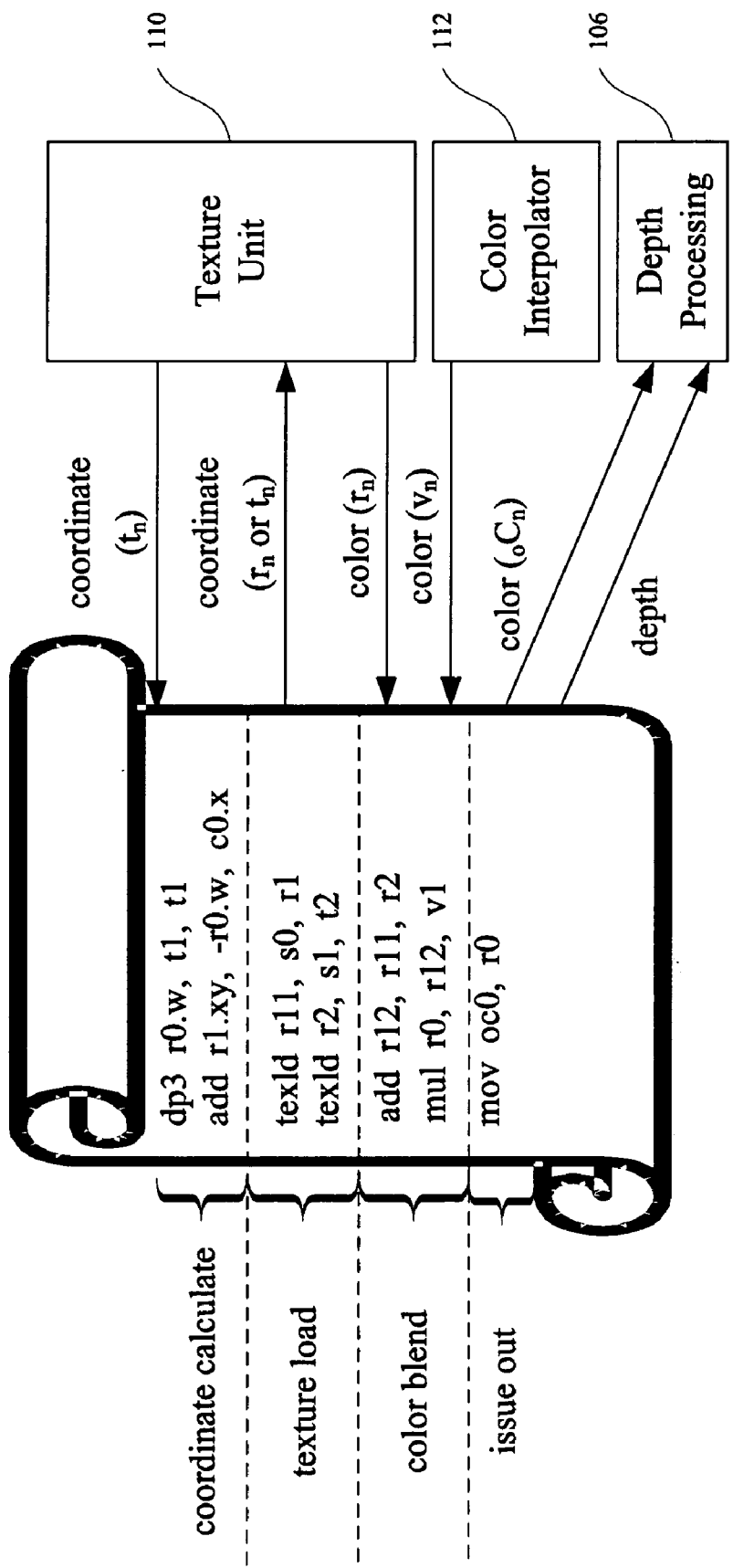
FIG. 2 is a block diagram of an example program in a pixel shader of the conventional graphic processor.
Figure 3B:
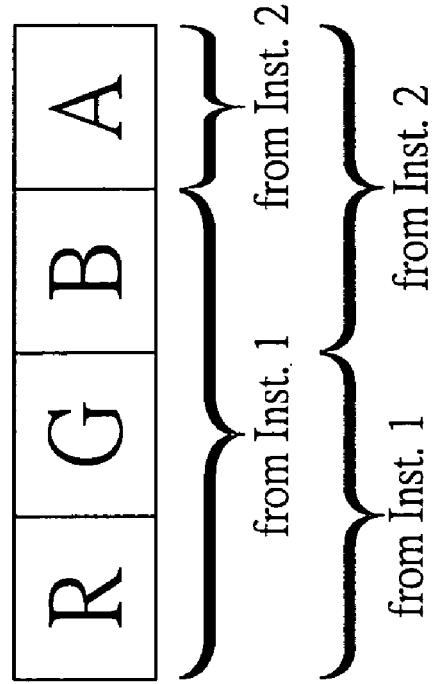
FIG. 3B is a ratio diagram of two color components to two transparency components for the instructions in a conventional pixel shader program.
Figure 3A:
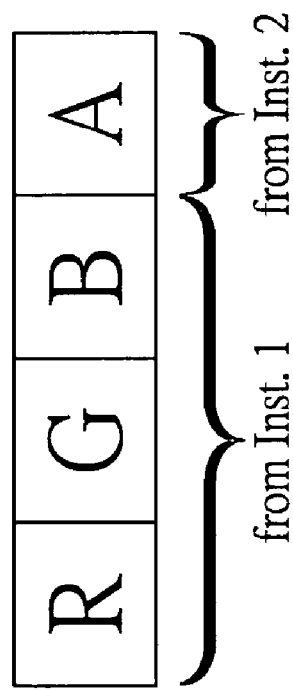
FIG. 3A is a ratio diagram of three color components to one transparency component for the instructions in a conventional pixel shader program.
Figure 4:
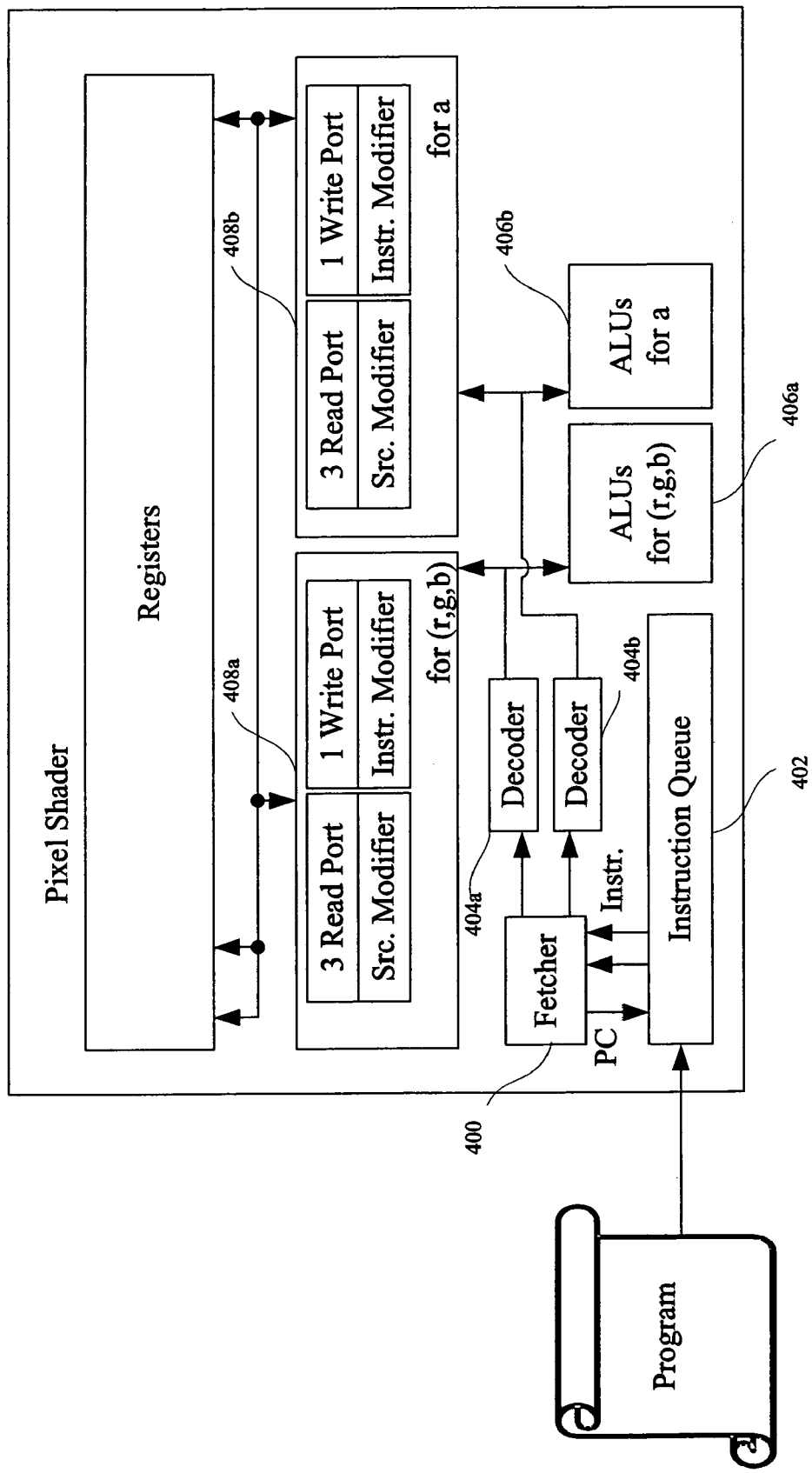
FIG. 4 is a conventional pixel shader with a co-issue mechanism.
Figure 5:
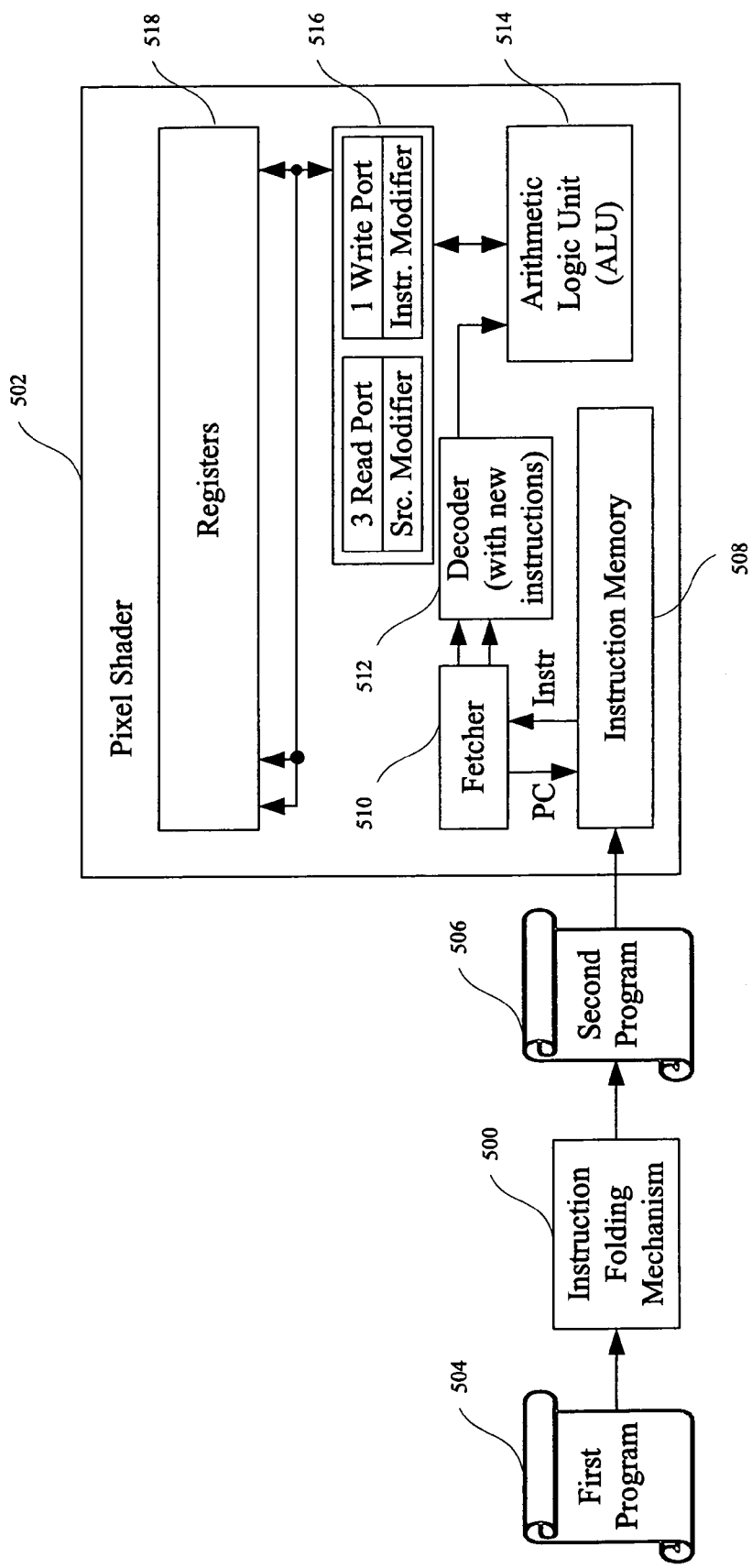
FIG. 5 is a block diagram of a pixel processing system having an instruction folding mechanism according to one preferred embodiment of the present invention.

FIG. 5 is a block diagram of a pixel processing system having an instruction folding mechanism according to one preferred embodiment of the present invention. The pixel processing system comprises an instruction folding mechanism 500 and a pixel shader 502. The instruction folding mechanism 500 folds a plurality of first instruction in a first program 504 to generate a second program 506 having at least one second instruction which is a combination of the first instruction. The pixel shader connected to the instruction folding mechanism 500 fetches the second program 506 to decode at least the second instruction having the combination of the first instruction to execute the second program 506.

Figure 6:
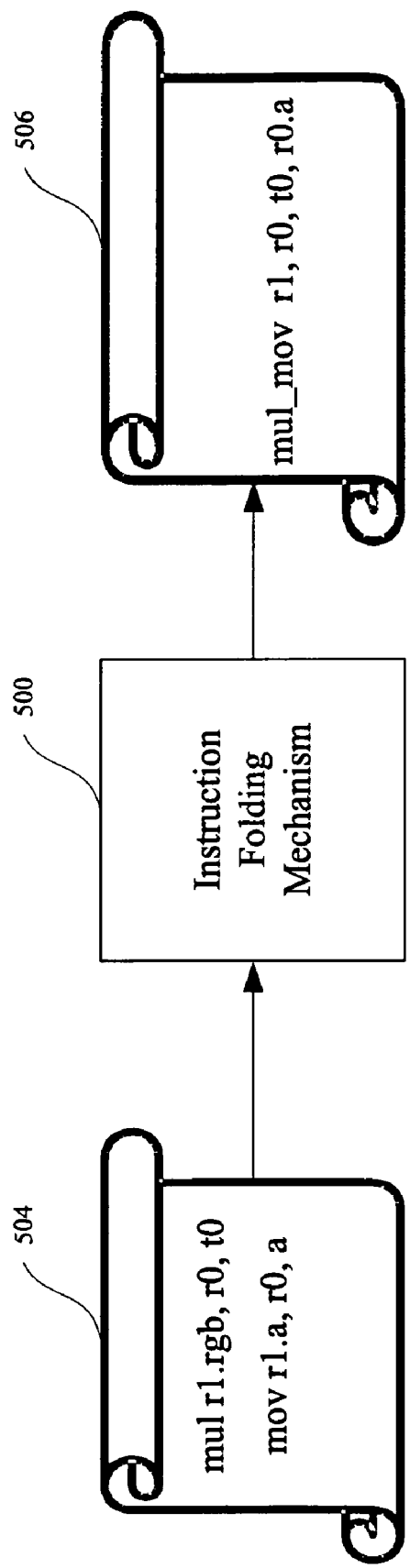
FIG. 6 is a block diagram of an example program applied to the instruction folding mechanism in FIG. 5 according to one embodiment of the present invention.

FIG. 6 is a block diagram of an example program applied to the instruction folding mechanism in FIG. 5 according to one embodiment of the present invention. The data of instruction "mul" is independent in the first program 504 from that of instruction "mov", and the data output of "mul" and "mov" is stored in an identical register, i.e. "$r_1$", but in different components. In one embodiment, the total number of source operands of the data is three, i.e. "r0", "t0", and "r0.a", and it can easily be performed by the instruction folding mechanism to create a new instruction, e.g. "mul_mov", as in the second program 506. Therefore, a decoder can easily decode the new "folded" instruction. Since the instruction of the pixel shader is able to cover the total number of the source operands, an additional operand capacity of the instruction is not required to expand in order to save hardware cost of the pixel shader. However, in the prior art of a co-issue architecture, additional decoders for operators, operation pipelines, register write ports and register read ports for the operator are necessary to be prepared. Furthermore, instructions should be provided with many processing abilities, e.g. component selections, format transformations, source code modifications, and instruction modifications of source and target operands. Therefore, it is important to reduce the number of the operands.

Figure 7:
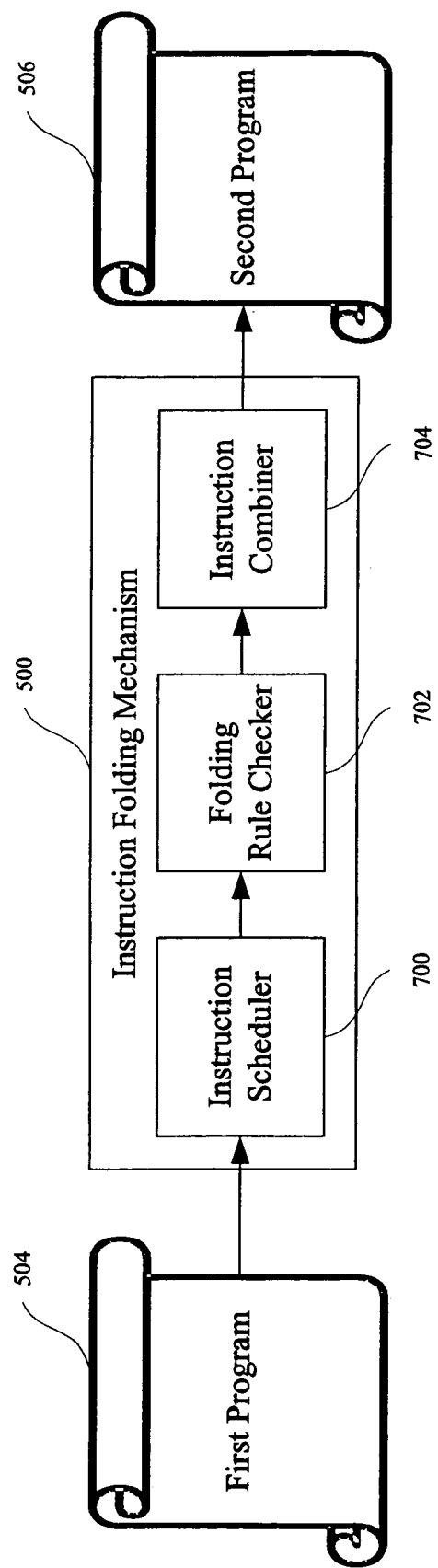
FIG. 7 is a detailed block diagram of the instruction folding mechanism in FIG. 5 according to one embodiment of the present invention.

FIG. 7 is a detailed block diagram of the instruction folding mechanism in FIG. 5 according to one embodiment of the present invention. The instruction folding mechanism 500 comprises an instruction scheduler 700, a folding rule checker 702, and an instruction combiner 704. The instruction scheduler 700 connected to the folding rule checker 702 is used to scan the first instruction according to static positions to schedule the first instruction in the first program 504. Preferably, the instruction scheduler 700 successively scans the first instruction. The folding rule checker 702 checks the first instruction according to a folding rule whether the first instruction has data independency. The instruction combiner 704 connected to the folding rule checker 702 can combine the first instruction having the data independency to generate at least the second instruction in the second program 506. Specifically, in one preferred embodiment of the present invention, a general formula of folding rule is represented as following items:

OPC1 tgt.[r|g|b], src0 , src1

OPC2 tgt.a, src2

OPC1_OPC2 tgt.[r|g|b]a, src0, src1, src2, where tgt.
  [r|g|b] ∩ src2=φ. (1)

OPC1 and OPC2 are arbitrary operators and OPC1_OPC2 is a new combination operator indicating an operation instruction which performs OPC1 in components (r, g, b) and OPC2 in component "a". The target operands, tgt.[r|g|b] and tgt.a, of OPC1 and OPC2 are in a same register, i.e. register "tgt", but in different components of "tgt". For example, component "a" is located in OPC1 and OPC2 at the same time. Additionally, the representation [r|g|b] means that components "r", "g", and "b" are not necessarily present but not limited to their presence Src0, src1, and src2 are source operands and have arbitrary component(s), where OPC1 is defined as a binary operator having two operands, including operands src0 and src1, or defined as a unary operator including operand src0 only. The formula of tgt.[r|g|b] ∩ src2=φ represents data independency in viewing of OPC1 and OPC2, which the operation results of OPC1 are irrelevant to that of OPC2. In one embodiment, instruction OPC1 is not required to be adjacent to OPC2 but only if the data of OPC1 is independent from that of OPC2. While taking the orders of instruction OPC1 and OPC2 into consideration, the formula of the folding rule also can be represented as follows:

OPC2 tgt.a, src2

OPC1 tgt.[r|g|b], src0, src1

OPC1_OPC2 tgt.[r|g|b]a, src0, src1, src2, where tgt.a
  ∩ (src0 ∪ src1)=φ. (2)

While instruction OPC1 is a unary operator and OPC2 is a binary operator, the formula of folding rule also can be represented as follows:

OPC1 tgt.[r|g|b], src0

OPC2 tgt.a, src1, src2

OPC1_OPC2 tgt.[r|g|b]a, src0, src1, src2, where tgt.
  [r|g|b] ∩ (src1 ∪ src2)=φ. (3)

OPC2 tgt.a, src1, src2

OPC1 tgt.[r|g|b], src0

OPC1_OPC2 tgt.[r|g|b]a, src0, src1, src2, where tgt.a
  ∩ src0=φ. (4)

When OPC2 is defined as a unary operator in the representation, operand includes src1 only.

In one preferred embodiment of the present invention, component "a" is operated alone and the result is then moved by instruction "mov" while component "a" is a "transparency" or coordinates of fourth dimension in the graphic effect applications. Component "a" is operated by instruction "rsq" to calculate the result of $(1/\sqrt{x})$ while component "a" is a distance or an angle from the light source in the lighting effect applications. While component "[r|g|b]" represents colors or coordinates, instructions "mov", "mul", "add", "mad", and "dp3" are usually used, for example. As a result, in one embodiment, when OPC1 is instructions "mov", "mul", "add", "mad", or "dp3" and OPC2 is "mov" or "rsq", the combination of OPC1_OPC2 can be instructions "mov_mov", "mul_mov", "add_mov", "dp3_mov", "mov$_3$rsq", "mul_rsq", "add_rsq", or "dp3_rsq". In the present invention, a decoder in the hardware is additionally able to decode these instructions of OPC1_OPC2 or other combinations of OPC1 and OPC2 to increase the capability of the pixel shader.

In another preferred embodiment of the present invention, the operands of new instructions of folding rule are four, src0, src1, src2, src3, and instruction "mad" can be used. Although, a register read port and source modifier in the hardware can be added, its cost-effectiveness is better than that of a co-issue mechanism. The general formula of folding rule is represented as follows:

OPC1 tgt.[r|g|b], src0, src1, src2

OPC2 tgt.a, src3

OPC1_OPC2 tgt.[r|g|b]a, src0, src1, src2, where tgt.
[r|g|b] ∩ src3=φ.                                                         (5)

Taking the order of instructions OPC1 and OPC2 into consideration, the formula of folding rule also can be represented as follows:

OPC2 tgt.a, src3

OPC1 tgt.[r|g|b], src0, src1, src2

OPC1_OPC2 tgt.[r|g|b]a, src0, src1, src2, where tgt.a
∩ (src0 ∪ src1 ∪ src2)=φ.                                         (6)

When OPC1 is defined as a unary operator, its operand includes src0 only, and when OPC1 is defined as a binary operator, its operands include src0 and src1.

When OPC1 is defined as a unary operator and OPC2 is a triple operator, additional folding rule is described as follows:

OPC1 tgt.[r|g|b], src0

OPC2 tgt.a, src1, src2, src3

OPC1_OPC2 tgt.[r|g|b]a, src0, src1, src2, src3, where
tgt.[r|g|b] ∩ (src1 ∪ src2 ∪ src3)=φ.                         (7)

OPC2 tgt.a, src1, src2, src3

OPC1 tgt.[r|g|b], src0

OPC1_OPC2 tgt.[r|g|b]a, src0, src1, src2, src3, where
tgt.a ∩ src0=φ.                                                           (8)

When OPC2 is defined as a unary operator, its operand includes src1 only, and when OPC2 is defined as a binary operator, its operands include src1 and src2.

When OPC1 is defined as a binary operator and OPC2 is a binary operator also, additional folding rule is described as follows:

OPC1 tgt.[r|g|b], src0, src1

OPC2 tgt.a, src2, src3

OPC1_OPC2 tgt.[r|g|b]a, src0, src1, src2, src3, where
tgt.[r|g|b] ∩ (src2 ∪ src3)=φ.                                  (9)

OPC2 tgt.a, src2, src3

OPC1 tgt.[r|g|b], src0, src1

OPC1_OPC2 tgt.[r|g|b]a, src0, src1, src2, src3, where
tgt.a ∩ (src0 ∪ src1)=100 .                                      (10)

When OPC1 is defined as a unary operator, its operand includes src0 only, and when OPC2 is defined as binary operator, its operands include src1 and src2. As a result, in one embodiment, when OPC1 is the instruction "mad" and OPC2 is the instructions "mov" or "rsq", the combination of OPC1_OPC2 can be instructions "mad_mov" and "mad_rsq".

In the relationship of data independency between two adjacent first instructions, the source register of the later first instruction is different from a target register of the former first instruction. In other words, both the source register of the later first instruction and the target register of the former first instruction have a null set, e.g. "tgt.[r|g|b] ∩ src2=φ" in the above-mentioned item (1). The data of the two adjacent first instructions is outputted into different components in the target register. In one embodiment, the total number of the source operands of the first and second instructions is within a predetermined threshold value, e.g. 3, 4, or more, so that the decoder can decode the combination of the first instructions. When the first instructions comprise at least two adjacent first instructions having data dependency, one instruction is written into the second program and the other is checked with a next first instruction according to the folding rule.

Referring to FIG. 5 again, the pixel shader comprises an instruction memory 508, a fetcher 510, a decoder 512, an arithmetic logic unit (ALU) 514, a register port 516, and a register unit 518. The instruction memory 508 is used to store the second instructions of the second program 506. The fetcher 510 connected to the decoder 512 fetches the second instructions stored in the instruction memory 508 according to a program counter. The decoder 512 decodes a control signal from the second instructions having the combination of the first instructions. The ALU 514 connected to the decoder 512 performs an operation of a plurality of register components of the second instructions according to the control signal. The register port connected to the ALU 514 is used to select the register components to transform operand formats of the second instructions. The register unit 518 connected to the register port 516 is employed to store data of the register components of the second instructions.

It should be noted that instruction folding mechanism 500 can be implemented in the forms of software or hardware. If implemented in software, the instruction folding mechanism 500 is a software tool kit running in an operating system (OS), a program loader or a part of a device driver attached to a latter part of a compiler. Furthermore, if implemented in a hardware, the instruction folding mechanism 500 is preferably connected to an instruction fetch unit or a decode unit, i.e. before the instruction queue unit and decoder of the pixel shader in the preferred embodiment, or may be built in a pixel shader.

Figure 8:
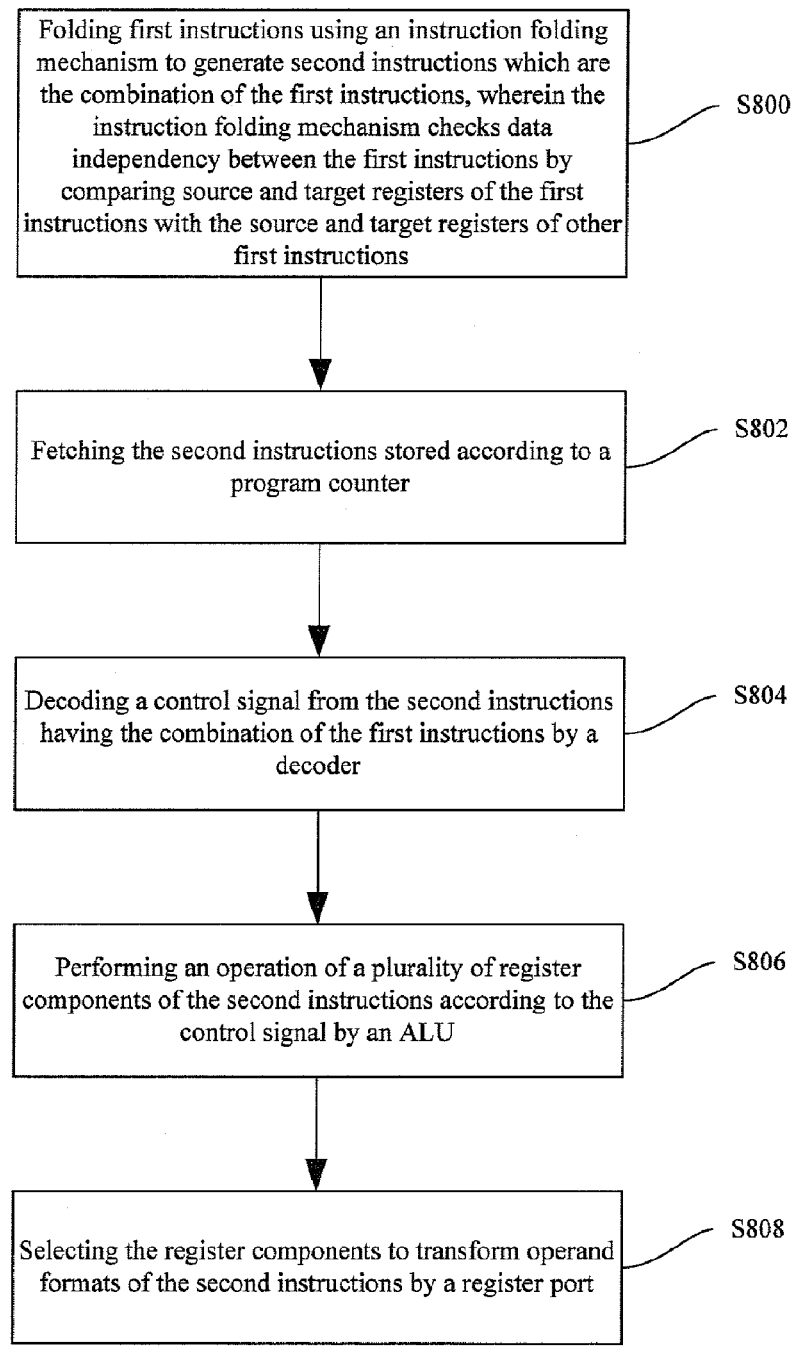
FIG. 8 shows a flow chart of performing a pixel processing system according to the present invention.

FIG. 8 shows a flow chart of performing a pixel processing system according to the present invention. Starting at step S800, a plurality of first instructions in a first program is folded by an instruction folding mechanism to generate a second program having at least one second instruction which is a combination of the first instructions.

In step S802, the second instructions are fetched according to a program counter. A control signal is decoded from the second instructions having the combination of the first instructions by a decoder, as shown in step S804. Then, in step S806, an operation of a plurality of register components of the second instructions is performed according to the control signal by an ALU. Finally, the register components are selected to transform operand formats of the second instructions by a register port in step S808.

Figure 9:
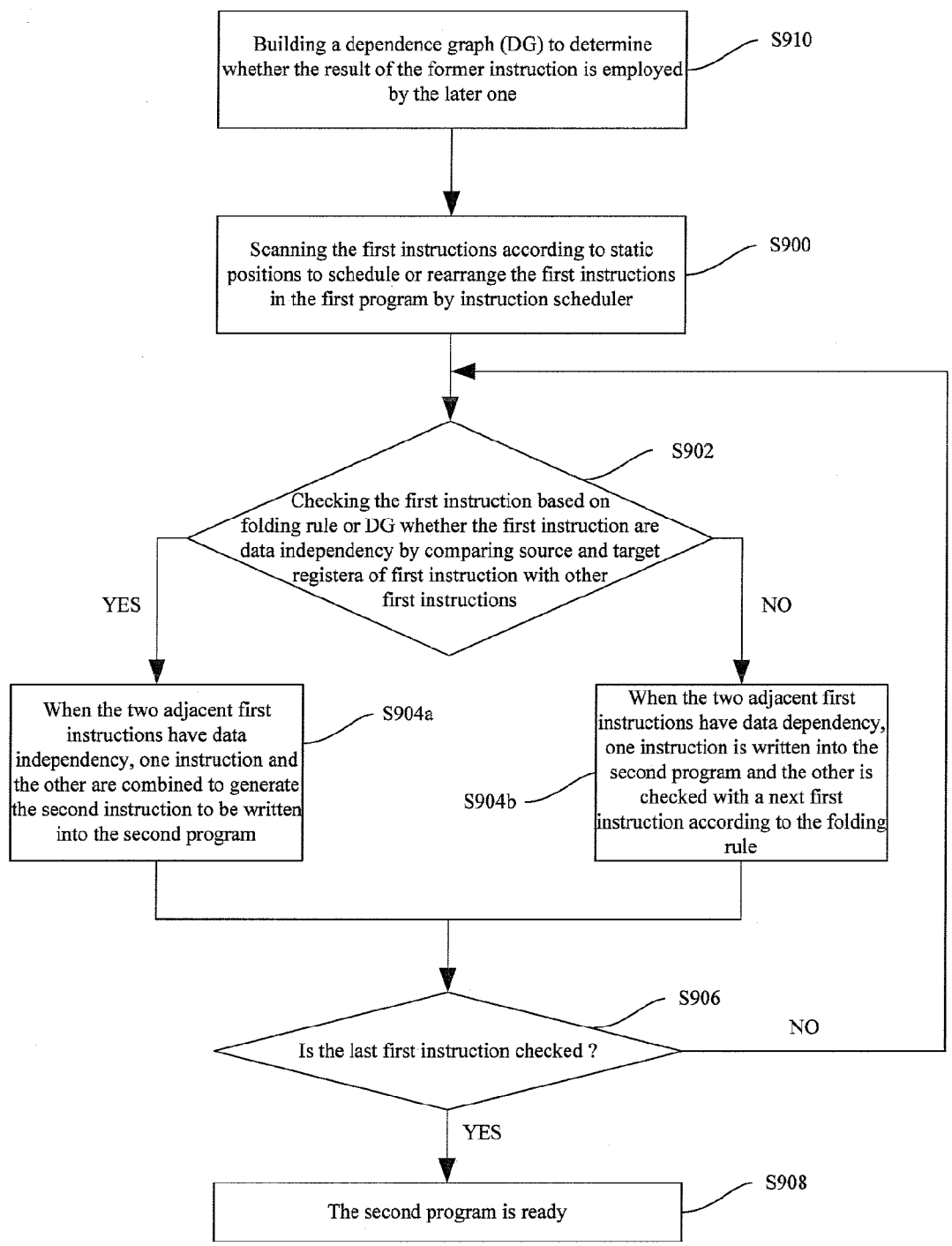
FIG. 9 shows a flow chart of performing an instruction folding mechanism of the pixel processing system in FIG. 8 according to the present invention.

FIG. 9 shows a flow chart of performing an instruction folding mechanism of the pixel processing system in FIG. 8 according to the present invention. During the step S800, the first instructions are scanned according to static positions to schedule or rearrange the first instructions in the first program or to rearrange the first instructions with data independency in step S900. Then, in step S902, the first instructions are checked by a folding rule checker according to a folding rule depending on whether the first instructions are data independent.

In step S904a, when the folding rule checker checks the first instructions by way of two adjacent first instructions and the two adjacent first instructions have data independency, one instruction and the other are combined to generate the second instruction to be written into the second program. In step S904b, when the folding rule checker checks the first instructions by way of two adjacent first instructions and the two adjacent first instructions have data dependency, one instruction is written into the second program and the other is checked with a next first instruction according to the folding rule. At step S906, the last first instruction is not processed and step S902 is proceeded again. The second program is then ready to be executed at step S908.

Preferably, during the step S900, the instruction scheduler builds a dependence graph (DG) to determine whether the result of the former instruction is employed by the later one to indicate data dependency relationship between the first instructions, where each of the instruction is a node, as shown in step S910. Specifically, in the dependence graph, when the node is connected by an edge sign, the instruction is dependent. On the contrary, if the instruction is independent, then the folding rule checker can scan the DG.

In the relationship of data independency between two adjacent first instructions, the source register of the later first instruction is different from a target register of the former first instruction. In other words, both the source register of the later first instruction and the target register of the former first instruction have a null set. Preferably, the data of the two adjacent first instructions are outputted into different components in the target register. The total number of the source operands of the first and second instructions is within a predetermined threshold value to be decoded by the decoder.

The advantages of the present invention include: (a) folding instructions with data independency into reduced instructions for generating a new program; (b) folding instructions having an identical target register and output data to different components of the target register to save the hardware cost of pixel processing system; and (c) providing a folding mechanism applied to a pixel processing system to improve the performance of the pixel processing system.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A pixel processing system comprising:
   an instruction folding mechanism for folding a plurality of first instructions in a first program to generate a second program having at least one second instruction which is a combination of the first instructions, wherein the instruction folding mechanism further comprises a folding rule checker for checking data independency between the first instructions by comparing at least one source resister and target resister of one first instruction with a plurality of source registers and target registers of other first instructions; and
   a pixel shader connected to the instruction folding mechanism for fetching the second program to decode at least the second instruction having the combination of the first instructions with the data independency based on the at least one source register and target register of the first instructions to execute the second program.

2. The pixel processing system according to claim 1, wherein the instruction folding mechanism further comprises an instruction combiner connected to the folding rule checker for combining the first instructions having the data independency to generate the second instruction.

3. The pixel processing system according to claim 1, wherein the instruction folding mechanism further comprises an instruction scheduler connected to the folding rule checker for scanning the first instructions according to static positions to schedule the first instructions in the first program.

4. The pixel processing system according to claim 3, wherein the instruction scheduler successively scans the first instructions.

5. The pixel processing system according to claim 1, wherein the data independency between two adjacent first instructions represents that a source register of the later first instruction is different from a target register of the former first instruction.

6. The pixel processing system according to claim 5, wherein the data of the two adjacent first instructions are outputted into different components in the target register.

7. The pixel processing system according to claim 5, wherein the total number of the source operands of the first and second instructions is within a predetermined threshold value to be decoded by the decoder.

8. The pixel processing system according to claim 1, wherein when the first instructions comprise at least two adjacent first instructions having data dependency, one instruction is written into the second program and the other is checked with a next first instruction according to the folding rule.

9. The pixel processing system according to claim 1, wherein the pixel shader comprises:
   a decoder for decoding a control signal from the second instructions having the combination of the first instructions;
   an arithmetic logic unit (ALU) connected to the decoder for performing an operation of a plurality of register components of the second instructions according to the control signal; and
   a register port connected to the ALU for selecting the register components to transform operand formats of the second instructions.

10. The pixel processing system according to claim 9, wherein the pixel shader further comprises:
    an instruction memory for storing the second instructions of the second program; and
    a fetcher connected to the decoder for fetching the second instructions stored in the instruction memory according to a program counter.

11. The pixel processing system according to claim 9, wherein the pixel shader further comprises a register unit connected to the port unit for storing data of the register components of the second instructions.

12. A method for performing a pixel processing system, the method comprising the steps of:
    folding a plurality of first instructions in a first program using an instruction folding mechanism to generate a second program having one second instruction which is a combination of the first instructions, wherein the instruction folding mechanism further comprises a folding rule checker for checking data independency between the first instructions by comparing at least one source register and target register of one first instruction with a plurality of source registers and target registers of other first instructions;
    fetching the second instructions stored according to a program counter;
    decoding a control signal from the second instructions having the combination of the first instructions with the data independency based on the at least one source register and target register of the first instructions by a decoder;

performing an operation of a plurality of register components of the second instructions according to the control signal by an ALU; and selecting the register components to transform operand formats of the second instructions by a register port.

13. The method according to claim 12, before the step of checking the first instructions, further comprising scanning the first instructions according to static positions to schedule the first instructions in the first program.

14. The method according to claim 13, wherein the instruction scheduler successively scans the first instructions.

15. The method according to claim 13, during the step of scanning the first instructions, further comprising rearranging the first instructions with data independency.

16. The method according to claim 12, wherein when the folding rule checker checks the first instructions by way of two adjacent first instructions and the two adjacent first instructions have data independency, one instruction and the other are combined to generate the second instruction to be written into the second program.

17. The method according to claim 16, wherein the data independency between the two adjacent first instructions is at least source register of the later first instruction is different from a target register of the former first instruction.

18. The method according to claim 17, wherein the data of the two adjacent first instructions are outputted into different components in the target register.

19. The method according to claim 17, wherein the total number of the source operands of the first and second instructions is within a predetermined threshold value to be decoded by the decoder.

20. The method according to claim 12, wherein when the folding rule checker checks the first instructions by way of two adjacent first instructions and the two adjacent first instructions have data dependency, one instruction is written into the second program and the other is checked with a next first instruction according to the folding rule.

21. The method according to claim 12, further comprising building a dependency graph to indicate data dependency between the first instructions.

* * * * *